United States Patent [19]

Maus

[11] Patent Number: 4,858,331
[45] Date of Patent: Aug. 22, 1989

[54] METHOD AND APPARATUS FOR MEASUREMENT OF CASTER, KING-PIN-INCLINATION, AND CAMBER ON MOTOR VEHICLES

[75] Inventor: Otfrid Maus, Darmstadt, Fed. Rep. of Germany

[73] Assignee: Schenck-Auto-Service-Gerate GmbH, Fed. Rep. of Germany

[21] Appl. No.: 91,422

[22] Filed: Aug. 31, 1987

[30] Foreign Application Priority Data

Sep. 11, 1986 [EP] European Pat. Off. ............ 86112596

[51] Int. Cl.⁴ .............................................. G01B 7/315
[52] U.S. Cl. ................................. 33/203.18; 33/366; 33/391
[58] Field of Search ................. 33/366, 365, 391, 203, 33/203.18, 203.15, 203.12, 371, 384, 608, 375, 335, 374, 288, 228, 336, 337, 340, 333

[56] References Cited

U.S. PATENT DOCUMENTS

| | | |
|---|---|---|
| 2,772,411 | 11/1956 | Cooper .................................... 33/360 |
| 3,855,709 | 12/1974 | Hirmann . | |
| 4,192,074 | 3/1980 | Chang ........................... 33/203.18 X |
| 4,389,793 | 6/1983 | Butler . | |
| 4,574,490 | 3/1986 | Curchod .......................... 33/203.18 |
| 4,686,772 | 8/1987 | Sobel ..................................... 33/333 |

FOREIGN PATENT DOCUMENTS

| | | |
|---|---|---|
| 0085924 | 8/1983 | European Pat. Off. . |
| 0140976 | 5/1985 | European Pat. Off. . |
| 879918 | 6/1953 | Fed. Rep. of Germany ........ 33/366 |
| 3203981 | 8/1983 | Fed. Rep. of Germany . |
| 2356122 | 1/1978 | France . |
| 2090974 | 7/1982 | United Kingdom . |

Primary Examiner—Harry N. Haroian
Attorney, Agent, or Firm—Connolly and Hutz

[57] ABSTRACT

A method is disclosed for the correction of errors in the measurement of caster, king-pin-inclination and camber on motor vehicles. Inclinometers are used whereby errors are avoided of the type caused by non-horizontal positioning of the vehicle under test. Measurements on the vehicle can easily be carried out without special loading-weights and without roping the vehicle down to the ground. The additional angles of error caused by the inclined position of the vehicle with respect to the horizontal are measured and combined as a correction factor with the measured geometrical values.

2 Claims, 2 Drawing Sheets

METHOD AND APPARATUS FOR MEASUREMENT OF CASTER, KING-PIN-INCLINATION, AND CAMBER ON MOTOR VEHICLES

BACKGROUND OF THE INVENTION

The invention addresses a method for measuring of caster, camber, and king-pin-inclination on motor vehicles by means of inclinometers, and also measuring apparatus for accomplishing such method.

The measurement of wheel-toe, camber, caster and king-pin-inclination, especially on passenger cars, presupposes, by definition, the fact that the longitudinal axis of the vehicle is positioned parallel to a horizontal plane during the measurements. Further, the transverse axis of the vehicle must also be positioned parallel to a horizontal plane if the king-pin-inclination and camber are measured.

Only in the rarest cases are these premises given in practice, and influences may be created by the loading condition of the vehicle to be measured. In order to achieve parallel positioning of the longitudinal and transverse vehicle axes relative to a horizontal plane, various methods are used in practice. For example, the vehicle is often loaded down with additional weights until a given spring deflection is achieved. Alternatively vehicles are loaded down with fixed weights, for instance 75 kg per passenger for two or four passengers, and in some cases additional weights must also be placed in the trunk. With vehicles having independent rear suspensions considerable errors in geometric values occur if the vehicles are unsymmetrically loaded.

Some vehicle manufacturers use ropes to pull the vehicle body toward the ground and pretension the ropes so that the longitudinal and transverse axes of the vehicle assume the desired ideal position.

With all these methods additional very strict requirements are required during the measurement process especially on the positioning location with respect to the horizontal orientation thereof. With hoists, these requirements are difficult to achieve and often require exceptional efforts because of deflections as a result of the vehicle weight.

SUMMARY OF THE INVENTION

It is therefore an aim of the present invention to measure vehicles in such a manner that the unfavorable influences of the described sources of error will be avoided, and that the measurement of the vehicle can be carried out easily without special weights and without tying the vehicle to the ground even on a surface which is not completely horizontal.

In accordance with the invention it is suggested that in cases of free positioning of the vehicle, at least one additional inclinometer be used to measure the inclination or angle of error of the longitudinal and transverse axes of the vehicle versus the once fixed in design or ideal horizontal position so it is further suggested that the angle of error be tied-in with the geometrical values. In detail one proceeds as follows: On a suitable spot on the frame of the vehicle or on the vehicle body, inclinometers are used to determine the angle of inclination of the vehicle's longitudinal axis on the one hand and of the vehicle's transverse axis on the other hand, both with respect to a conceptual horizontal plane. The angles determined with the inclinometers are tied into or combined with the measured values on the facility and are compared to the specifications for the particular vehicle under test.

The tied-in values may involve a simple subtraction or addition. But the tie-in may also consist of a rundown of tables as is required for vehicles with semi-trailing arm rear suspensions which tables are issued by the vehicle manufacturer for a given vehicle type. Finally it is possible to calculate by known formula, a value of correction from the measured inclination, and using the known geometric values of the suspension for a given vehicle type, this will allow a correction of the measured wheel-position values without any steps, so as to obtain as a final result of the tie-in-procedure the same values for camber, wheel-toe, caster and king-pin-inclination that would be measured if the vehicle was in an ideal position upon a horizontal reference plane. In the case of a vehicle with semi-trailing arm rear suspension, it is possible that an angle of error in the positioning of the vehicle on the measuring pad also has a falsifying influence upon the wheel-toe of the front wheels even though the wheel-toe angle is not defined within the gravitational field of the earth. Even this error can be pre-calculated by means of a function, thus the measured result of wheel-toe can be corrected.

In many cases a surface parallel in the nominal condition of the vehicle's longitudinal-transverse plane cannot be found on the chassis or body of a vehicle. In those cases it is suggested, in keeping with the invention, that additionally the deviating position of a support surface for the measuring device provided within the vehicle with respect to the once determined ideal horizontal position, should also be considered in the determination of the angle of error.

All suitable known instruments may be used as inclinometers, such as inclination pendulums with electrical resistance transducers, inclination pendulums with current balancing via inductive, capacitive or optical pickup of the control value. However, for better illustration of the description of the invention a measuring instrument for carrying out the method is used that distinguishes itself in that a pendulum with seismic mass is rotatably suspended in a housing, that an arm-like extension of the pendulum makes electrical contact with a resistor strip via a wiper, that a bridge circuitry is provided, consisting of resistor strip 13 and fixed resistors, that an amplifier follows the bridge circuitry and that an indicating instrument is connected to the amplifier. As a modification of this measuring device it is suggested that additionally an analog to digital converter is connected to the amplifier. By means of these structures and in accordance with the invention, all measured values of inclination may be compared in a computer circuitry with the nominal values for a given vehicle type. At the same time, such a computer circuitry considers mathematically the compensation of the inclinations of the support surface of the measuring device inside the vehicle.

In a further modification of the measuring instrument it is suggested that the housing be equipped with fixed legs and height-adjustable legs, and that a scale be provided on the housing. By means of the above, the inclination may be controlled or may be preadjusted with respect to the inclination required for positioning the measuring device on the chassis or body of the vehicle in order to determine the ideal horizontal position of the vehicle or in order to include same in the measurement.

BRIEF DESCRIPTION OF THE DRAWINGS

Novel features and advantages of the present invention in addition to those noted above will become apparent to those of ordinary skill in the art from a reading of the following detailed description in conjunction with the accompanying drawing wherein similar reference characters refer to similar parts and in which.

DETAILED DESCRIPTION OF THE INVENTION

Figure 1:
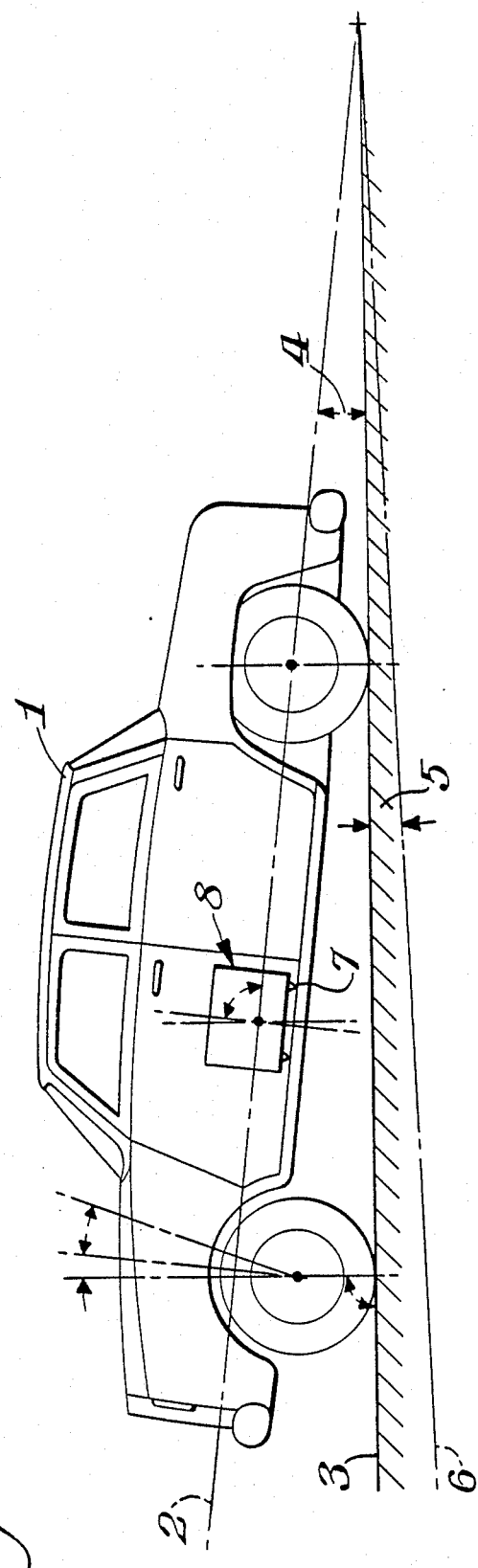
FIG. 1 is a side elevational view of a vehicle under investigation with the circuitry of the present invention.

FIG. 1 represents the basic concept of a measuring device, according to the invention. Vehicle 1 with its longitudinal center axis 2 is positioned upon a non-horizontal plane 3. Because of its loading, for instance a completely full fuel tank, there is an angle of error 4 between the longitudinal center axis 2 and the positioning plane 3. A further angle of error 5 exists as a result of the non-horizontal positioning plane 3 via-a-vis the horizontal plane 6.

Figure 2:
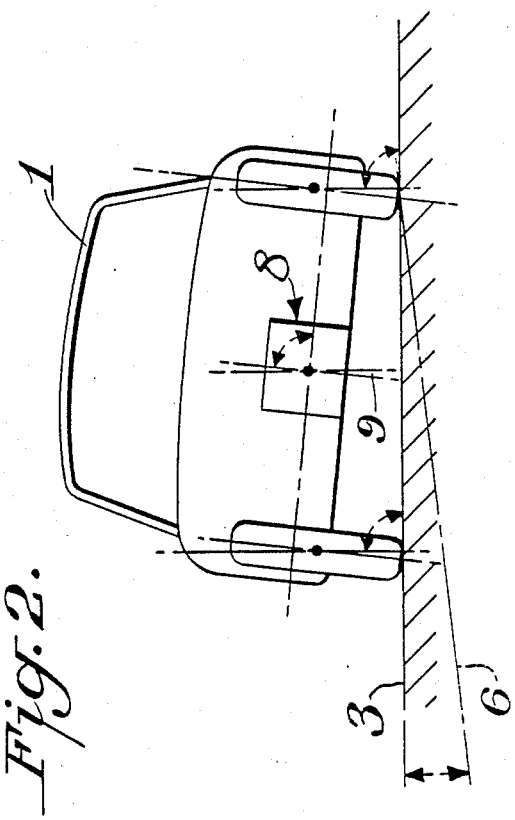
FIG. 2 is a front elevational view of the vehicle and circuitry of FIG. 1.

An inclinometer 8 is positioned upon a reference spot 7 of the vehicle 1. This instrument measures the inclination of the longitudinal vehicle axis 2 versus the horizontal plane 6. Further, the inclinometer 8 can, in combination with a second inclinometer that measures the crosswise inclination of the vehicle to the horizontal plane, measure the following. As shown in FIG. 2, the vehicle 1 is positioned askew with respect to positioning plane 3, and such may be caused by unsymmetrical transverse loading. Positioning plane 3 in turn has an angle of error in the transverse direction toward the horizontal plane 6. Angle 9 toward the vertical axis is measured by the second inclinometer of the measuring device 8 and is transmitted to a processing device as an error toward the horizontal plane.

Figure 3:
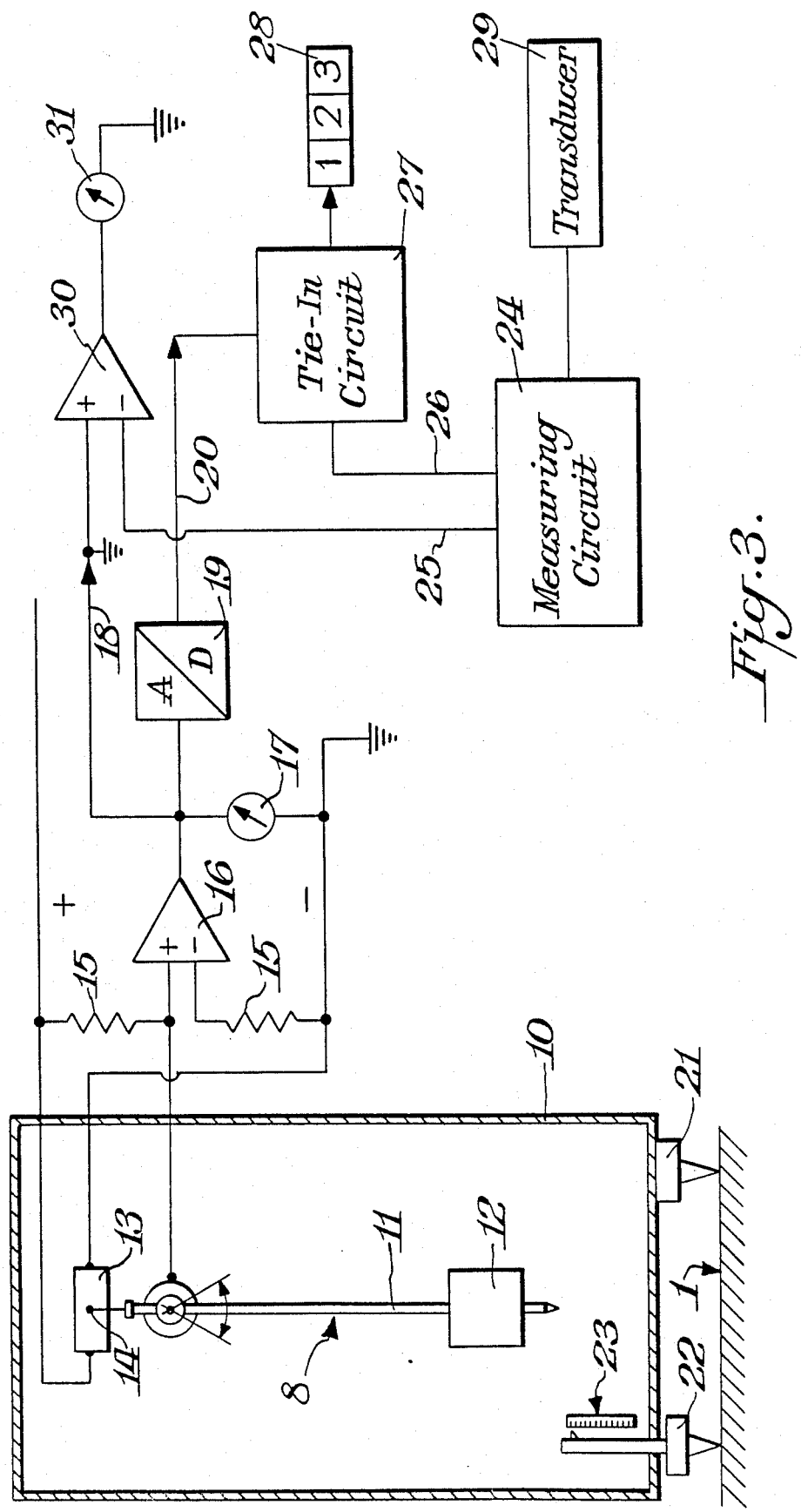
FIG. 3 is a diagrammatic view of a measuring device according to the present invention including a schematic of electrical circuitry.

FIG. 3 diagrammatically illustrates an example of a simple inclinometer 8 for one of the horizontal or transverse coordinates. A housing 10 includes an inclination pendulum 11 with a seismic mass 12 suspended therefrom. The elongated upper arm of pendulum 11 makes electrical contact with a resistor strip 3 by means of wiper 14. The resistor strip 13 represents part of a resistor bridge together with fixed resistors 15. The voltage differential of the bridge circuitry is amplified suitably in amplifier 16 and is displayed in the indicating instrument 17.

The output value of the amplifier 16 may be transmitted to analog tie-in circuitry (not shown) via output terminals 18.

Finally, the measured value of inclination may be transmitted, via output terminals 20, after transformation into digital form in an analog to digital converter 19, to a digital computer circuitry for tie-in of the measured angles of error of the vehicle versus the horizontal plane with the measured camber and caster angles of the vehicle.

Housing 10 is supported upon fixed legs 21 and upon adjustable legs 22. Scale 23 allows the reading of a correction value, for instance on the door sill, for the adjustment of the inclinometer for a given installation position inside the vehicle which may be neither parallel to the longitudinal nor to the transverse axis of the vehicle. In keeping with the invention, the inclinometer for the longitudinal axis may be housed together with a further inclinometer for the transverse axis or they may be combined.

The tie-in of the analog output values 20, for instance, with the geometric values measured by transducer 29, is achieved by means of the measuring circuit 24 for geometric values and the output leads 25 via an add and/or subtract amplifier 30.

The corrected geometric values are then indicated by instrument 31. In case of digital inducation display, the output values of the A-D convertor 19 are transmitted to tie-in circuit 27, and the true geometric values measured by transducer 29 are transmitted digitally from measuring circuit 24 via output leads 26 to the tie-in circuit 27. The tie-in circuit 27 may, according to given functions, make a tie-in between the values received from leads 20 and 26 in such a form, that the indicating system 28 is presenting error free geometric values.

What is claimed is:

1. In a process for the measurement of caster, camber and king-pin-inclination of a freely positioned motor vehicle comprising the steps of measuring the geometric values of caster, camber and king-pin-inclination while the vehicle is freely positioned, utilizing an inclinometer to measure a shift angle while the vehicle is freely positioned, and correcting the measured geometric values obtained while the vehicle was freely positioned with the measured shift angle, the improvement comprising utilizing at least one additional inclinometer along the longitudinal or traverse axis of the vehicle to measure the inclination of the vehicle relative to a horizontal plane along the axis where the additional inclinometer is positioned, and correcting the measured geometric values in accordance with the measured inclination along the axis where the additional inclinometer is positioned.

2. A method as in claim 1 including the steps of measuring the inclinations of the vehicle along both the longitudinal and transverse axes of the vehicle under test, and correcting the geometric values in accordance with the measured inclinations.

* * * * *